United States Patent
Eavenson, Sr. et al.

(10) Patent No.: US 7,419,106 B2
(45) Date of Patent: Sep. 2, 2008

(54) BLOWER NOZZLE WITH VARIABLE VELOCITY OUTPUT

(75) Inventors: Jimmy N. Eavenson, Sr., Aurora, OH (US); William Kocka, Medina, OH (US); Amit Saha, N. Ridgeville, OH (US)

(73) Assignee: Commercial Turf Products, Ltd., Streetsboro, OH (US)

( * ) Notice: Subject to any disclaimer, the term of this patent is extended or adjusted under 35 U.S.C. 154(b) by 1116 days.

(21) Appl. No.: 10/046,379

(22) Filed: Jan. 10, 2002

(65) Prior Publication Data

US 2003/0127546 A1 Jul. 10, 2003

(51) Int. Cl.
 *B05B 1/26* (2006.01)
 *B05B 1/34* (2006.01)
 *B05B 1/00* (2006.01)

(52) U.S. Cl. ............... 239/461; 239/600; 239/601; 239/589; 15/405; 15/418; 15/361; 15/414; 138/177

(58) Field of Classification Search ............ 239/77, 239/78, 513, 600, 601, 587.1, 546, 461; 15/328, 15/330, 338, 405, 418, 361, 414; 138/177
See application file for complete search history.

(56) References Cited

U.S. PATENT DOCUMENTS

| | | | |
|---|---|---|---|
| 2,908,933 A * | 10/1959 | Todd, Jr. et al. ............ 15/414 |
| 4,413,371 A | 11/1983 | Tuggle et al. | |
| 5,107,566 A | 4/1992 | Schmid | |
| D382,683 S | 8/1997 | Henke et al. | |
| 5,652,995 A | 8/1997 | Henke et al. | |
| 5,689,852 A * | 11/1997 | Svoboda et al. ............ 15/405 |
| 5,735,018 A | 4/1998 | Gallagher et al. | |
| 5,950,276 A | 9/1999 | Everts et al. | |
| 6,003,199 A * | 12/1999 | Shaffer ..................... 15/405 |
| 6,076,231 A | 6/2000 | Bucher | |
| 6,253,416 B1 * | 7/2001 | Lauer et al. ............... 15/361 |
| 6,378,166 B1 * | 4/2002 | Bruno et al. .............. 15/414 |
| 6,548,760 B1 * | 4/2003 | Stout, Jr. .................. 174/650 |

* cited by examiner

*Primary Examiner*—Len Tran
*Assistant Examiner*—James S Hogan
(74) *Attorney, Agent, or Firm*—Wegman, Hessler & Vanderburg

(57) ABSTRACT

A nozzle for use with a walk-behind blower includes a nozzle restriction due to a sloped upper wall of the nozzle body. The nozzle restriction increases the air velocity in the upper region of the nozzle and forces leaves and debris downward so that airflow through the lower region of the nozzle more effectively laterally displaces them. The configuration of the nozzle body may be adapted to accommodate a variety of engine outputs while utilizing a common design for a blower frame, impeller and shroud.

9 Claims, 2 Drawing Sheets

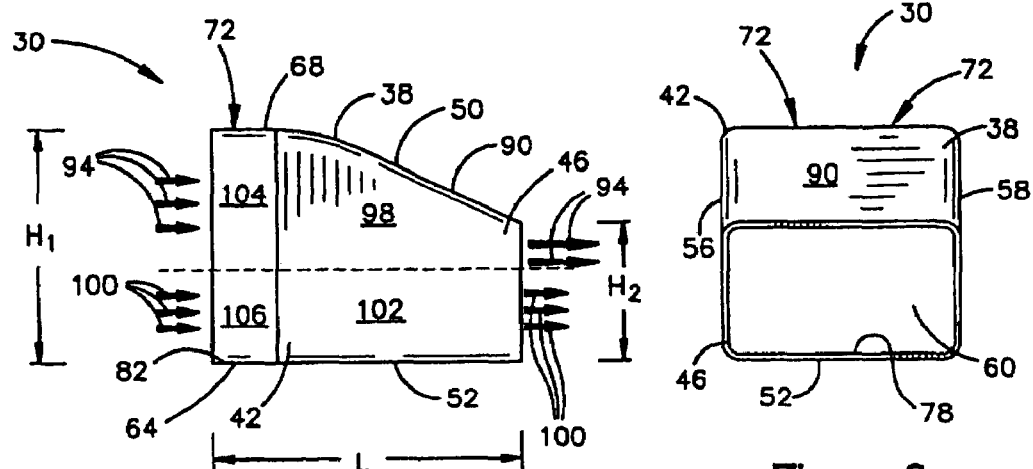
Figure 2
Figure 3
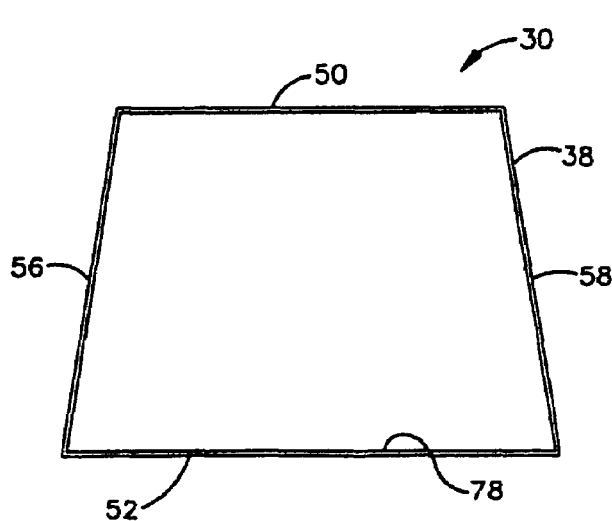
Figure 4

BLOWER NOZZLE WITH VARIABLE VELOCITY OUTPUT

BACKGROUND OF THE INVENTION

1. Field of Invention

This invention pertains to a blower nozzle adapted to be mounted to a discharge chute of a blower for moving debris, and more specifically to a blower nozzle having variable velocity output.

2. Description of the Related Art

Mobile blowers for moving leaves and other debris from lawns, driveways or other surfaces are known in the art. Generally, a blast of air is directed from a blower outlet toward or across the surface to be cleared. The blower outlet is usually adapted to be adjacent the ground so that the air blast exits from the bottom of the blower.

Currently available walk behind type blowers are generally one of three configurations: fixed direction output, bi-directional output using a diverting valve, and variable-direction output using means to rotate the blower nozzle.

For the fixed direction blowers, the output from the blower is in one direction relative to the blower housing (shroud) and frame. The velocity profile within the outlet nozzle area is typically unknown and of no concern. In order to re-direct the airflow, the entire blower must be repositioned.

For the bidirectional blowers, the output (all or a portion thereof) can be redirected to a secondary orientation relative to the blower housing by the use of a valve or deflector. These nozzles can provide a split of the airflow whereby 0% to 100% of the airflow can be redirected. This splitting of the airflow could provide for a change in the outlet velocity profile such that higher speed air could be directed differently from the air of lower speed or "normal" velocity. One such blower is disclosed in U.S. Pat. No. 5,735,018 to Gallagher et al.

For the variable directional blowers, the output can be redirected by repositioning the blower nozzle in relation to the shroud.

The above configurations require that many different support frames, blower housings, and impellers be made available to accommodate various output control means, shroud designs, and engine types. The designs also require that the user adjust the control means that has almost infinite settings and this can provide operator confusion, loss of productivity, and reduced blower efficiency.

The present invention provides for nozzle(s) on the outlet section of centrifugal blowers that are configured to optimize blower performance with respect to air velocity.

The present invention provides for reduced upward and longitudinal displacement of leaves and debris while enhancing lateral displacement.

For other tasks such as sidewalk cleaning, drying grass, drying pavement, inflating tents, replenishing air in tunnels, tanks, etc., the nozzle can be repositioned or inverted to optimize performance.

SUMMARY OF THE INVENTION

In accordance with the present invention, there is provided a nozzle adapted for mounting on the discharge chute of a blower. The nozzle includes a nozzle body having an upper wall, a lower wall, and spaced, generally parallel side walls defining a channel being open at an inlet end and open at an outlet end. The upper wall includes a sloped region to provide a nozzle restriction.

According to another aspect of the invention, the nozzle body is open at an inlet end and open at an outlet end, and the inlet end and the outlet end are in flow communication through a channel formed in the nozzle body. The nozzle body includes a nozzle restriction so that air passing through an upper region of the channel changes direction from the inlet end to the outlet end and air passing through a lower potion of the channel flows in a generally constant direction from the inlet end to the outlet end.

According to another aspect of the invention, the channel is associated with a first cross-sectional area at the inlet end, and the channel is associated with a second cross-sectional area at the outlet end, wherein the second cross-sectional area is less than the first cross-sectional area.

According to another aspect of the invention, the channel is associated with a first cross-sectional area at the inlet end, and the channel is associated with a second cross-sectional area at the outlet end. The second cross-sectional area is less than the first cross-sectional area.

According to another aspect of the invention, there is provided a combination of a blower for generating a flow of air, the blower having a discharge chute, and a nozzle, the nozzle being adapted for mounting on the discharge chute. The airflow through the discharge chute generally has a greater velocity in a lower region than in an upper region. In the combination, the discharge chute has a generally planar lower interior surface, and the nozzle has a nozzle body having an upper wall, a lower wall, and spaced side walls defining a channel being open at an inlet end and open at an outlet end. The lower wall has an interior surface being generally aligned with the lower interior surface of the discharge chute and the upper wall including a sloped region to provide a nozzle restriction.

One advantage of the present invention is that the optimization of the air velocity profile across the nozzle outlet provides increases lateral displacement of leaves and debris.

Another advantage of the present invention is that the improved results of the blower are accomplished without operator intervention in realigning vents or directional flaps.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein:

FIG. 2 is a side view of a blower nozzle in accordance with the present invention;

FIG. 3 is a front view of the blower nozzle shown in FIG. 2; and,

FIG. 4 is a cross sectional view of an alternate embodiment of the nozzle taken along the line 4-4 of FIG. 1.

DESCRIPTION OF THE PREFERRED EMBODIMENT

Figure 1:
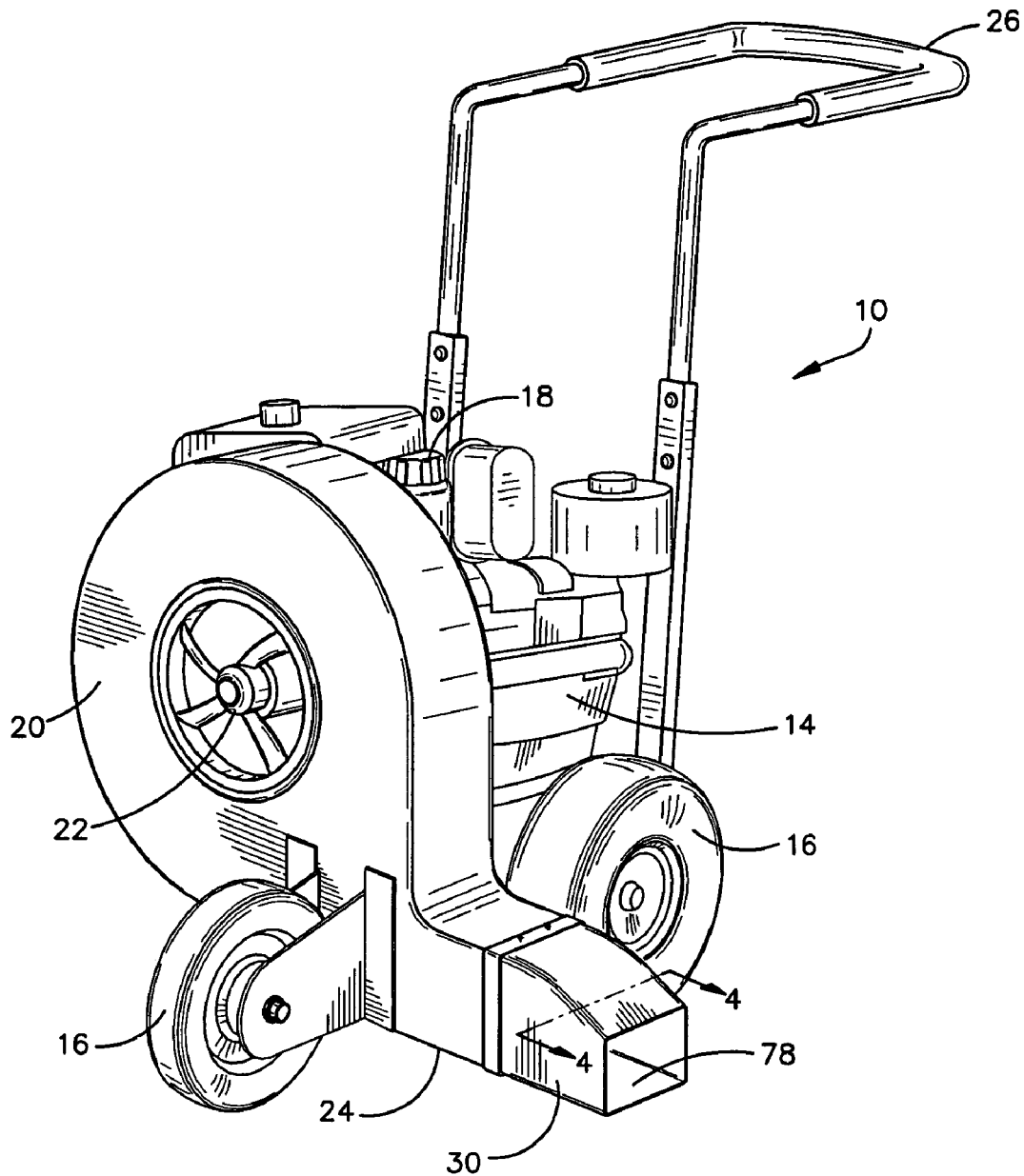
FIG. 1 is a perspective view of a blower for moving debris having a blower nozzle in accordance with the present invention.

Referring now to the drawings wherein the showings are for purposes of illustrating a preferred embodiment of the invention only and not for purposes of limiting the same, FIG. 1 is directed to a centrifugal-type blower 10 having a frame 14 mounted on wheels 16. A motor 18 is mounted to frame 14. A blower housing or shroud 20 with an inlet opening 22 and an outlet 24 is mounted to frame 14. A handle 26 is also attached to the frame 14 and is adapted for an operator to push in order to move the blower 10 along a surface to be cleared, dried, etc.

The present invention is specifically directed to a blower nozzle 30 adapted to be in flow communication with the outlet 24. In centrifugal-type blowers, the air velocity is generally higher in the lower (most distant radial) sections of the shroud. In prior art blower designs, this higher velocity profile at ground level produces eddy currents and turbulence that can cause leaves and debris to spin upward and out of the main airflow whereby they are not transported laterally by the main air stream but are longitudinally displaced when the blower is propelled. To maximize performance for specific tasks such as leaf blowing, the inventive blower nozzle 30 is configured to increase the air velocity in the upper section of the nozzle. This configuration improves lateral displacement of leaves, minimizes the effects of eddy currents and forces leaves downward toward the ground or other surface, so that the airflow from the lower section of the nozzle 30 may be more effectively utilized.

The present invention is adapted to be further utilized to inflate tents, replenish air in tunnels or tanks, dry pavement, dry ball fields, and the like by repositioning or inverting the blower nozzle 30.

The present invention is further adapted to use a uniform blower housing or shroud 20 and impeller (not shown) for blowers having either larger or smaller power rated engines by varying the nozzle restriction.

With reference to FIG. 2, the nozzle 30 includes a body 38 having an open inlet end 42, an open outlet end 46 and upper wall 50, lower wall 52 and spaced side walls 56, 58 defining an internal channel 60. (The terms "upper" and "lower" refer to the position of the blower nozzle 30 as illustrated only and not by way of limiting the invention.)

Located at inlet end 42 is an attachment region 64 for attachment to the outlet 24 of the blower shroud 20. In the preferred embodiment, the nozzle 30 is adapted to receive a portion of outlet 24 within the nozzle body 38. In the preferred embodiment, the attachment region 64 includes at least one flap 68 that may be secured to outlet 24 by any suitable attachment means 72 such as screws. The channel 60 is adapted to be in flow communication with outlet 24.

In the preferred embodiment, lower wall 52 includes a generally planar interior surface 78 that is adapted to be generally aligned with the lower interior surface 82 of the outlet 24 when the nozzle 30 is connected to outlet 24.

With reference again to FIGS. 2 and 3, the upper wall 50 is adapted to include a sloped region 90 that extends along a portion of the length, L, of the nozzle body 38. Sloped region 90 acts to gradually decrease the height of channel 60 from the inlet end 42 toward the outlet end 46 to thereby provide a nozzle restriction. In the preferred embodiment, the channel 60 therefore has a maximum height, $H_1$, near the inlet end 42 and a minimum height, $H_2$, at the outlet end 46. In the preferred embodiment, $H_2$ is approximately from 50% to 75% of $H_1$.

In the preferred embodiment, side walls 56, 58 are generally planar and remain generally parallel to each other over the length, L, of the nozzle body 38.

The dimensions of the nozzle body 38 and channel 60, L, $H_1$ and $H_2$, are adapted to provide the desired air velocity profile at the outlet end 46. The dimensions may be varied in order to optimize airflow in regard to velocity, volume, and head for specific tasks. In that way, a uniform blower shroud 20 can be utilized with a variety of engine power outputs. As such, common components such as blower housing 20, support frame 14, impeller (not shown), and others, can be utilized in a variety of applications by varying the nozzle restriction.

In the preferred embodiment, the shape of the nozzle body 38 and hence channel 60 utilizes the faster moving air in the lower (most radial distant) sections of the shroud 20 to provide lateral movement of leaves and debris. The sloped region 90 directs the airflow downwardly to reduce eddy currents as the air passes through outlet end 46. Arrows 94 in FIG. 2 illustrate the airflow in the upper region 98 of nozzle 30, while arrows 100 illustrate the airflow in lower region 102 of nozzle 30. "Upper region 98" and "lower region 102" signify zones separated by an imaginary plane drawn through a point midway between the upper wall 50 and lower wall 52 at the inlet end 42 and generally parallel to interior surface 78. The nozzle restriction provided by sloped region 90 increases the air velocity in the upper region 98 through the nozzle 30 as compared to the airflow in the upper region 104 of outlet 24. The airflow through the lower region 102 of nozzle 30 remains generally constant with the airflow through the lower region 106 of outlet 24.

As illustrated in FIG. 3, the nozzle 30, actually channel 60, is associated with a first cross-sectional area at the inlet end 42. The nozzle 30 is associated with a second cross-sectional area at the outlet end 46. In the preferred embodiment, the second cross-sectional area is preferably approximately 50% to 75% of the first cross-sectional area.

As further illustrated in FIG. 2, the airflow in outlet 24 is generally unidirectional. As the airflow enters nozzle 30, the direction of the airflow in the lower region 102 remains constant while the direction of the airflow in the upper region 98 changes due to the presence of sloped region 90.

The invention has been described with reference to preferred embodiment. Obviously, modifications and alterations will occur to others upon a reading and understanding of this specification. It is intended to include all such modifications and alternations in so far as they come within the scope of the appended claims or the equivalence thereof. Having thus described the invention, it is now claimed:

What is claimed is:

1. A nozzle mounted on the discharge chute of a blower, said blower having a frame supporting at least one wheel and a handle for pushing the blower along a surface to be swept of debris, said nozzle comprising: a nozzle body being open at an inlet end and open at an outlet end, said inlet end and said outlet end being in flow communication through a channel formed in said nozzle body, said channel being associated with a first cross-sectional area at said inlet end, and said channel being associated with a second cross-sectional area at said outlet end, wherein said second cross-sectional area is less than said first cross-sectional area, the reduction in cross-sectional area being substantially caused by a change in the shape of the channel in an upper portion of the nozzle body, such that air velocity though an upper region of the channel is greater than the air velocity through a lower region of the channel at the outlet end, thereby producing a variable airflow profile at the surface being swept with higher velocity air above lower velocity air that is conducive to lateral displacement of the debris.

2. The nozzle of claim 1 wherein said second cross-sectional area is approximately 50% to 75% of said first cross-sectional area.

3. The nozzle of claim 1 wherein the shape of said channel at the inlet end is such that the cross-sectional area of an upper region of the channel located above a plane drawn midway between an upper wall and a lower wall of the nozzle body is substantially equal to the cross-sectional area of a lower region of the channel below the plane at said inlet end, and wherein the shape of the channel changes between said inlet end and said outlet end such that the cross-sectional area of the upper region of the channel at the outlet end is smaller than the cross-sectional area of the lower region of the channel at the outlet end thereby forming a restriction in the upper end, the change in channel shape causing air from said blower to travel at a higher velocity at the outlet end in the upper region of the channel than air passing through the lower region of the channel.

4. In combination, a blower for generating a flow of air out of a discharge chute, said blower having a frame supporting at least one wheel and a handle for pushing the blower along a surface to be swept of debris, and a nozzle, said nozzle being adapted for mounting on the discharge chute, wherein the airflow through said discharge chute generally has a greater velocity in a lower region than in an upper region, wherein the combination comprises: said discharge chute having a generally planar lower interior surface; and, said nozzle having a nozzle body having an upper wall, a lower wall, and spaced side walls defining a channel being open at an inlet end and open at an outlet end, said lower wall having an interior surface being generally aligned with said lower interior surface of said discharge chute and said nozzle body being shaped to provide a nozzle restriction in an upper region of said nozzle body such that the air velocity in the upper region is greater than the air velocity in a lower region of the nozzle at the outlet end, thereby producing a variable airflow profile at the surface being swept with higher velocity air above lower velocity air that is conducive to lateral displacement of the debris.

5. The combination of claim 4 wherein: said channel is associated with a first cross-sectional area at said inlet end, and said channel is associated with a second cross-sectional area at said outlet end, wherein said second cross-sectional area is less than said first cross-sectional area.

6. The combination of claim 5 wherein: said second cross-sectional area is approximately 50% to 75% of said first cross-sectional area.

7. The combination of claim 4 wherein the shape of said channel at the inlet end is such that the cross-sectional area of an upper region of the channel located above a plane drawn midway between an upper wall and a lower wall of the nozzle body is substantially equal to the cross-sectional area of a lower region of the channel below the plane at said inlet end, and wherein the shape of the channel changes between said inlet end and said outlet end such that the cross-sectional area of the upper region of the channel is smaller than the cross-sectional area of the lower region of the channel causing air from said blower to travel at a higher velocity in the upper region of the channel than air passing through the lower region of the channel at the outlet end.

8. A nozzle mounted on a discharge chute of a blower, said blower having a frame supporting at least one wheel and a handle for pushing the blower along a surface to be swept of debris, said nozzle comprising a nozzle body being open at an inlet end and open at an outlet end, said inlet end and said outlet end being in flow communication through a channel formed in said nozzle body, wherein the shape of said channel at the inlet end is such that the cross-sectional area of an upper region of the channel located above a plane drawn midway between an upper wall and a lower wall of the nozzle body and parallel with the lower wall along the length of the channel is substantially equal to the cross-sectional area of a lower region of the channel below the plane at said inlet end, and wherein the shape of the channel changes between said inlet end and said outlet end because of a sloped region in said upper wall such that the cross-sectional area of the upper region of the channel at the outlet end is smaller than the cross-sectional area of the lower region of the channel at the outlet end causing air from said blower to travel at a higher velocity in the upper region of the channel than air passing through the lower region of the channel at the outlet end thereby producing a variable airflow profile at the surface being swept with higher velocity air above lower velocity air that is conducive to lateral displacement of the debris.

9. The nozzle of claim 8 wherein the shape of the nozzle at the inlet end is substantially the same as the shape of the discharge chute such that the nozzle is mountable on the discharge chute.

* * * * *